United States Patent [19]

Matsui et al.

[11] Patent Number: 4,716,215
[45] Date of Patent: Dec. 29, 1987

[54] COMPRESSION MOLDABLE AROMATIC POLYAMIDE POWDER

[75] Inventors: Hideo Matsui; Hiroshi Fujie; Takashi Noma, all of Iwakuni, Japan

[73] Assignee: Teijin Limited, Osaka, Japan

[21] Appl. No.: 828,237

[22] Filed: Feb. 10, 1986

[30] Foreign Application Priority Data

Feb. 15, 1985 [JP] Japan ............................ 60-26429
Aug. 27, 1985 [JP] Japan ............................ 60-186596
Aug. 28, 1985 [JP] Japan ............................ 60-187324

[51] Int. Cl.$^4$ ............................................ C08G 69/32
[52] U.S. Cl. .................................. 528/348; 521/185; 524/606
[58] Field of Search .................. 528/348; 521/185; 524/606

[56] References Cited

U.S. PATENT DOCUMENTS

| | | | |
|---|---|---|---|
| 3,413,394 | 11/1968 | Jordan | 264/126 |
| 3,925,323 | 12/1975 | Turnbull | 528/348 |
| 3,955,236 | 6/1976 | Turnbull | 264/319 |
| 4,036,907 | 7/1977 | Turnbull | 260/857 |
| 4,283,361 | 8/1981 | Longworth | 264/120 |

*Primary Examiner*—Harold D. Anderson
*Attorney, Agent, or Firm*—Burgess, Ryan and Wayne

[57] ABSTRACT

A new type of aromatic polyamide powder including a large number of fine coalescible paticles which have an average size of from 0.1 to 10 μm, which include at least one aromatic amide polymer including 40 to 100 molar % of recurring m-phenylene isophthalamide units and 0 to 60 molar % of at least one other type of additional recurring aromatic amide units, for example, m-phenylene terephthalamide units, and which coalesce with each other to form porous agglomeraters having an average size of from 10 to 400 μm and a surface area of from 1 to 20 m$^2$/g, and can be compression molded, optionally in mixture with a reinforcing additive, for example, aromatic polyamide fibers having a length of 3 mm or less, at a temperature of 200° to 400° C. under a pressure of 300 to 1000 kg/cm$^2$ for 20 minutes to 5 hours, to produce shaped articles having excellent mechanical properties and appearance.

10 Claims, 2 Drawing Figures

(x 100)

(x 5000)

COMPRESSION MOLDABLE AROMATIC POLYAMIDE POWDER

BACKGROUND OF THE INVENTION

1. Field of the Invention

The present invention relates to a compression moldable aromatic polyamide powder and a process for producing a compression molded article from the same. More particularly, the present invention relates to an aromatic polyamide powder in which particles of the aromatic polyamide are coalesced with each other into porous agglomeraies and which is useful for compression molding and a process for producing a compression molded article having an enhanced impact resistance from the above-mentioned aromatic polyamide powder.

2. Description of the Related Art

It is known that an aromatic amide polymer consisting of recurring m-phenylene isophthalamide units exhibits excellent heat resistance and fire retardant property, and a satisfactory solubility in various solvents. Therefore, it is also known that the aromatic amide polymer is useful for producing fibers, films, and fibrids by a dry method or wet method. The poly(m-phenylene isophtalamide) fibers are known by the trademark TEIJINCONEX or NOMEX and are used in various fields.

The above-mentioned aromatic amide polymer is, however, disadvantageous in that the aromatic amide polymer cannot be shaped by means of a conventional metal-molding process. Therefore, the production of a shaped article having a large thickness from the aromatic amide polymer is difficult. The only known process for producing a shaped thick article from the aromatic amide polymer is disclcsed in U.S. Pat. No. 3,925,323 for J. W. Turnbull or Japanese Unexamined Patent Publication (Kokai) No. 52-130,866 for E. I. Du Pont de Nemours and Company. In the known process, solid grains of the aromatic amide polymer are finely pulverized, the resultant power is preliminarily molded, and the resultant precursory molded article is sintered by heating it at a high temperature for a long period of time to form a shaped article.

In the above-mentioned process, a solution of the aromatic amide polymer is mixed with a precipitation reagent to convert the solution to a slurry, the slurry is homogenized by means of agitation and is filtered, the resultant solid particles of the aromatic amide polymer are collected, washed, and dried, the dried solid particles are pulverized into fine particles having an apparent bulk density of 0.2 g/cm² or more and a surface are of 40 m²/g, the fine particles are preliminarily molded under a pressure of 10,000 psi or more, and the resultant precursory molded article is sintered in an inert atmosphere at a temperature of 250° C. to 350° C. for several hours to provide a shaped and sintered aromatic amide polymer article.

The above-mentioned known process is disadvantageous not only in that the two steps of preliminary molding and sintering are necessary to shape the aromatic amide polymer powder, but also in that the sintering step must be carried out for a considerably long time to sufficiently sinter and bond the aromatic amide polymer particles to each other and to provide a sintered article having a satisfactory high mechanical strength.

Also, it has long been desired by industry to provide an aromatic amide polymer material useful for producing a shaped article having an enhanced impact resistance and a process for producing the enhanced impact resistant shaped article from the aromatic amide polymer material.

SUMMARY OF THE INVENTION

An object of the present invention is to provide an aromatic polyamide powder which can be converted to a shaped article having satisfactory mechanical strength, including impact resistance, by a single-step compression molding procedure and a process for producing a compression molded article from the aromatic polyamide powder.

The above-mentioned object is attained by the aromatic polyamide of the present invention, which comprises a number of fine coalescible particles which have an average size of from 0.1 to 10 $\mu$m, which comprise at least one aromatic amide polymer comprising 40 to 100 molar % of recurring m-phenylene isophthalamide units and 0 to 60 molar % of at least one other type of additional recurring aromatic amide units, and which coalesce with each other to form porous agglomerates having an average size of from 10 to 400 $\mu$m and a surface area of from 1 to 20 m²/g.

Also, a shaped aromatic polyamide article having enhanced mechanical strengths, including enhanced impact resistance, is produced by the process of the present invention, comprising the steps of: charging a compression mold with a feed comprising an aromatic polyamide powder comprising a number of fine coalescible particles which have an average size of from 0.1 to 10 $\mu$m, which comprise at least one aromatic amide polymer comprising 40 to 100 molar % of recurring m-phenylene isophthalamide units and 0 to 60 molar % of at least one other type of additional recurring aromatic amide units, and which coalesce with each other to form porous agglomerates having an average size of from 10 to 400 $\mu$m and a surface area of from 1 to 20 m²/g; and heat-compressing the feed in the mold at a temperature of from 200° C. to 400° C. under a pressure of 300 to 1000 kg/cm² for a time period of from 20 minutes to 5 hours.

DESCRIPTION OF THE PREFERRED EMBODIMENTS

Figure 1:
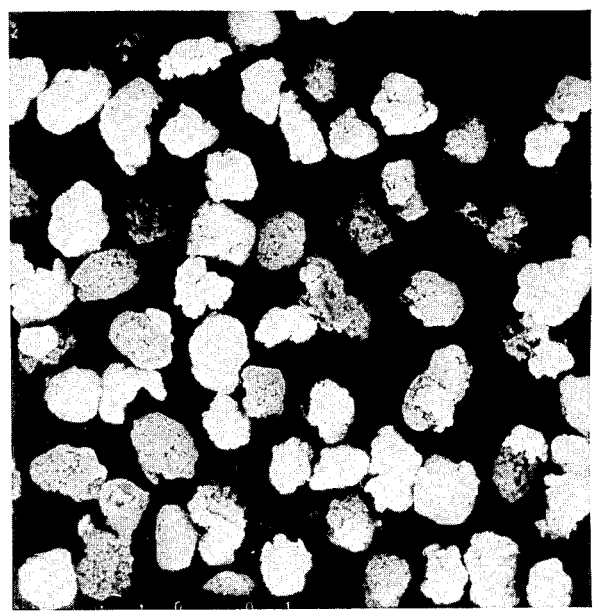
FIG. 1 is a microscopic photograph of an embodiment of aromatic amide polymer particle agglomerates of the present invention and FIG. 2 is a microscopic photograph of the agglomerates shown in FIG. 1 at a greater magnification.

The aromatic polyamide powder of the present invention comprises a number of fine coalescible particles which comprise at least one aromatic amide polymer having 40 to 100 molar %, preferably 85 to 100 molar %, of recurring m-phenylene isophthalamide units of the formula:

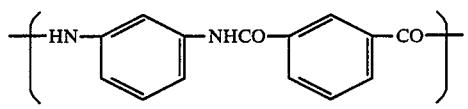

and 0 to 60 molar % preferably, 0 to 15 molar %, of at least one other type of additional recurring aromatic amide units.

The additional recurring amide units are derived from an aromatic dicarboxylic acid component, selected from, for example, terephthalic acid, methylterephthalic acid, and naphthalene 2,6-dicarboxylic acid, and dianhydrides and acid halides of the above-mentioned acids, and an aromatic diamine component selected from, for example, p-phenylene diamine, 3,4'- and 4,4'-diaminodiphenyl ethers, and m-xylylene diamine.

When the additional recurring units are m-phenylene terephthalamide units, it is preferable that the aromatic amide polymer comprises 20 to 60 molar %, more preferably, 30 to 45 molar %, of m-phenylene terephthalamide units and 40 to 80 molar %, more preferably, 55 to 70 molar %, of m-phenylene isophthalamide units. This type of aromatic amide polymer having the m-phenylene terephthalamide units and m-phenylene isophthalamide units is useful for providing an aromatic polyamide powder useful for producing compression molded articles having an enhanced impact resistance.

When the content of m-phenylene terephthalamide units in the polymer is less than 20 molar %, the resultant compression molded article sometimes exhibits an excellent heat resistance and an unsatisfactory impact resistance. Also, when the content of m-phenylene terephthalamide units is more than 60 molar %, the resultant aromatic polyamide powder sometimes exhibits a poor compression moldability.

The m-phenylene terephthalamide unit-containing aromatic amide copolymer may contain a further additional aromatic amide unit derived from methyl-terephthalic acid, naphthalent 2,6-dicarboxylic acid and dianhydrides and acid halides of the above-mentioned acids and p-phenylene diamine, 3,4'- and 4,4'-diaminodiphenyl ethers, and m-xylylene diamine.

Usually, the aromatic amide polymer usable for the present invention preferably exhibits an inherent viscosity of from 0.5 to 4.0, more preferably from 0.7 to 2.5, determined in a solution thereof in N-methyl-2-pyrrolidone at a temperature of 30° C. The aromatic amide polymer having the above-mentioned inherent viscosity is effective for causing the aromatic polyamide polymer of the present invention to exhibit an excellent moldability and the resultant shaped article to exhibit an enhanced mechanical property and thermal property.

For the purpose of enhancing the heat resistance of the resultant shaped aromatic polyamide article, it is preferable that at least 10 molar % of the terminal radicals of the aromatic amide polymer molecules be blocked by at least one type of mono-functional aromatic compound, for example, aniline or benzoyl chloride. It is more preferable that the molar amount of the terminal radicals blocked with the monofunctional aromatic compound be in the range of from 20 to 50 molar % based on the entire molar amount of the terminal radicals.

The aromatic amide polymer particles optionally contain an additive, for example, delustering agent, coloring material, or filler. However, the particles should be free from a substance which causes heat resistance of the resultant shaped article to be reduced, for example, lithium chloride or calcium chloride.

The fine coalescible aromatic amide polymer particles of the present invention have an average size of from 0.1 to 10 $\mu$m, preferably from 0.2 to 5 $\mu$m, and coalesce with each other to form a number of porous agglomerates having an average size of from 50 to 400 $\mu$m, preferably from 60 to 300 $\mu$m and a relatively small surface area of from 1 to 20 m$^2$/g, preferably from 3 to 10 m$^2$/g.

The porous agglomerates of the present invention are characterized in that the surface area thereof is of a relatively small level of 1 to 20 m$^2$/g, in comparison with that of the conventional aromatic amide polymer particle agglomerates, which is of a level of from 50 to 80 m$^2$/g, in spite of the fact that the agglomerates of the present invention are porous.

Referring to FIG. 1, which is a microscopic photograph (magnification: 100) of an embodiment of aromatic amide polymer particle agglomerates of the present invention, the agglomerates of the present invention are approximately in the form of spherical or columnar grains and have a pumice-like porous structure.

Figure 2:
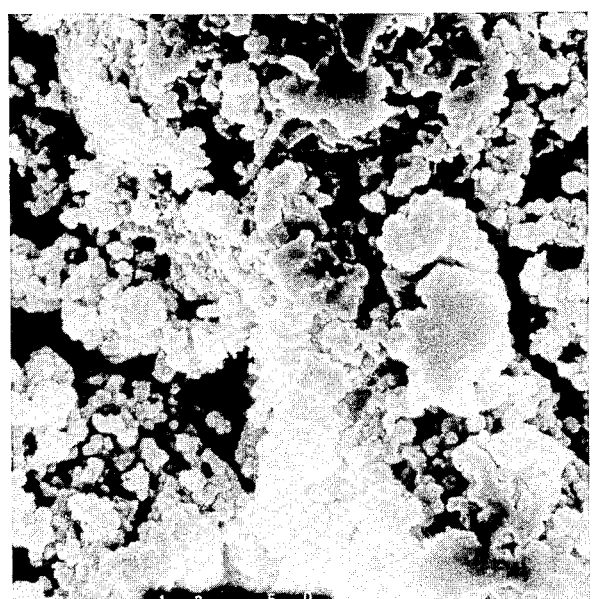

Referring to FIG. 2, which is a microscopic photograph in a magnification of 5000 of the same agglomerates as those indicated in FIG. 1, the agglomerates are composed of a large number of fine aromatic amide polymer particles which coalesce with each other and contain a number of small pores formed between coalesced particles located in the surface portions and inside portions of the agglomerates.

Accordingly the agglomerates have a very small apparent bulk density of from 0.2 to 0.4 g/cm$^2$, in comparison with the density of the aromatic amide polymer.

The fact that the agglomerates of the present invention have a relatively small surface area of from 1 to 20 m$^2$/g in spite of the high porous structure thereof suggests that almost all of the pores located in the inside of the agglomerates are independent from each other and are not connected to the outside atmosphere of the agglomerates.

The aromatic amide polymer particle agglomerates of the present invention are produced by the same interfacial polymerization process as that disclosed in U.S. Pat. No. 3,640.970 for S. Ozawa et al, except that the first step reaction and the second step reaction in the interfacial polymerization are specifically controlled.

The interfacial polymerization process of the U.S. patent comprises a first step wherein substantially equimolar amounts of at least one diamine and a dihalide of at least one saturated aliphatic hydrocarbon or carbocyclic aromatic dicarboxylic acid are reacted with each other in a polar, nonbasic, and inert organic liquid medium in which the resultant polyamide is insoluble, to provide a precondensation product having an inherent viscosity of no greater than 0.2 as measured for a solution of 0.5 g of the precondensation product in 100 ml of concentrated sulfuric acid at 30° C., and a second step reaction in which the precondensation product is converted to an aimed aromatic amide polymer by bringing the resultant dispersion of the precondensation product is the inert organic liquid medium into contact with an aqueous solution of a water-soluble inorganic acid acceptor for a time sufficient to form the aimed polymer, while the reaction mixture is stirred by rotating stirring wings.

In order to produce the aromatic amide polymer particle agglomerates of the present invention in accordance with the above-mentioned interfacial polymerization process, it is necessary to control the volume (A) of the precondensation product-containing dispersion in the inert organic liquid medium and the volume (B) of the aqueous solution of the water-soluble inorganic acid acceptor so as to satisfy the following equation:

$$0.4 < \frac{A}{A+B} < 0.6$$

Also, in the second step reaction, it is important that the stirring wings rotate at a wing end speed of 10 m/sec or more.

In the first step reaction, the reaction mixture may be admixed with a small amount of the above-mentioned monofunctional aromatic compound such as aniline to block a portion of the terminal radicals of the resultant precondensation product molecules and to enhance the heat resistance of the resultant polymer.

The resultant product is washed with water, dried, and, if necessary, screened to collect the aromatic amide polymer particle agglomerates of the present invention having the necessary average size.

The aromatic polyamide powder of the present invention can be compression molded by any known compression molding method and by means of any known compression molding apparatus usable for conventional thermosetting resins and thermoplastic resins.

In the process of the present invention, a feed comprising the aromatic polyamide powder of the present invention is charged into a compression mold having a desired shape and dimensions and the feed in the mold is heat-compressed at a temperature of from 200° C. to 400° C., preferably from 280° C. to 330° C., under a pressure of from 300 to 1,000 kg/cm$^2$, preferably from 350 to 500 kg/cm$^2$, for a time period of from 20 minutes to 5 hours. A molded article having a desired shape and dimensions is thus produced.

In the compression molding process, the feed comprising the aromatic polyamide powder of the present invention is preheated, if necessary, and then fed into the mold. Also, when the heat-compression is carried out at a high temperature, for example, 200° C. to 400° C., it is preferable that the feed in the mold be prevented from contact with air or another molecular oxygen-containing gas. For this purpose, air in the mold is removed and the inside of the mold is maintained in a vacuum condition or is filled by an inert gas, for example, nitrogen or helium.

In the process of the present invention, the feed to be charged into the compression mold may consist of the aromatic polyamide powder of the present invention alone.

Otherwise, the feed consists of a mixture of the aromatic polyamide powder of the present invention with a reinforcing additive. The reinforcing additive is preferably in an amount of 40% or less, more preferably from 3% to 30%, still more preferably from 5% to 25%, based on the weight of the aromatic amide polymer particle agglomerates.

When the content of the reinforcing additive is more than 40% based on the weight of the agglomerates, it is sometimes difficult to evenly disperse the reinforcing additive in the agglomerate, the resultant feed sometimes exhibits a poor moldability, and the resultant shaped article is sometimes brittle.

Also, if the content of the reinforcing additive is less than 2%, the resultant reinforcing effect on the shaped article is sometimes unsatisfactory.

The reinforcing additive preferably comprises at least one member selected from synthetic polymer fibers, carbon fibers, and synthetic polymer pulp particles.

The synthetic polymer fibers usable as the reinforcing additive preferably consists of an aromatic amide polymer, for example, poly(m-phenylene isophthalamide), poly(m-phenylene isophthalamideterephthalamide) copolymer, poly (p-phenylene terephthalamide), or a para-aromatic amide copolymer containing, as a copolymerization diamino component, 3,4-diaminodiphenylether, as disclosed in U.S. Pat. No. 4,075,172 for Ozawa et. al.

The synthetic polymer fibers and the carbon fibers usable as the reinforcing additive preferably have a short cut length of 3 mm or less, preferably from 1 to 3 mm, and a diameter of from 7 to 50 μm.

When the length of the reinforcing fibers is more than 3 mm, it is sometimes difficult to uniformly disperse the reinforcing fibers in the feed and therefore, the resultant feed sometimes exhibits an unsatisfactory moldability.

The reinforcing synthetic polymer pulp particles preferably consist of an aromatic amide polymer, for example, poly(m-phenylene isophthalamide), poly(m-phenylene isophthalamide-terephthalamide) copolymer, poly (p-phenylene terephthalamide), or a para-aromatic amide copolymer containing, as a copolymerization diamino component, 3,4-diaminodiphenylether, as disclosed in U.S. Pat. No. 4,075,172 for Ozawa et. al. The reinforcing synthetic polymer pulp particles can be produced by a conventional method, for example, disclosed in U.S. Pat. No. 2,999,788 for Norgan, U.S. Pat. No. 4,511,623 for Yoon et. al. or Japanese Examined Patent Publication (Kokoku) No. 59-603. The reinforcing additive-containing feed can be compression molded in the same heat compression as above-mentioned, at a temperature of from 200° C. to 400° C. under a pressure of from 300 to 1000 kg/cm$^2$ for 20 minutes to 5 hours.

The aromatic polyamide powder of the present invention is highly advantageous over the conventional aromatic polyamide powder in that the powder can be compression molded into a shaped article having a satisfactory mechanical strength, including impact resistance, by a single-step compression molding procedure.

That is, the aromatic polyamide powder of the present invention exhibits an excellent moldability and a superior mold release characteristic. Therefore, in the compression molding procedure for the aromatic polyamide powder of the present invention, no mold release agent is necessary. Also, it is important that the aromatic amide polymer particle agglomerates for the aromatic polyamide powder of the present invention can be easily produced by an interfacial polymerization procedure under specific conditions in a high efficiency. This polymerization procedure includes no depositing step for the resultant polymer and no pulverizing step for the resultant polymer deposit. Accordingly, the aromatic amide polymer particle agglomerates of the present invention can be produced in a relatively low cost.

Also, it should be noted that the aromatic amide polymer produced by the interfacial polymerization procedure is free from inorganic salts and therefore, the molded product from the polymer exhibits excellent heat resistance.

Furthermore, it is a great advantage of the present invention that the resultant molded article from the aromatic polyamide powder of the present invention exhibits not only an excellent heat resistance and flame retardant property and satisfactory mechanical properties, for example, impact resistance, tensile strength, and ultimate elongation, but also surprisingly enhanced self-lubricating properties. Accordingly, a cutting or shaving operation for the shaped article can be easily carried out.

Accordingly, the aromatic polyamide powder and the process of the present invention are useful for producing various shaped article including, for example, machine parts, for instance, bearings and gears.

The present invention will be illustrated in detail by the following examples.

In the examples, the average size, surface area, and apparent bulk density of the aromatic amide polymer particle agglomerates were measured and determined as follows.

A. Average size

A microscopic photograph for aromatic amide polymer particle agglomerates to be tested was prepared. In the microscopic photograph of a magnification of 100, 100 agglomerates were randomly selected and the sizes of the 100 agglomerates were measured. The average size of the agglomerates was determined from the sizes of the 100 agglomerates.

Additionally, 10 agglomerates were randomly selected for each of the agglomerates, and a microscopic photograph of a large magnification of 5000 was prepared. In each photograph, 10 fine particles of the aromatic amide polymer appearing on the surface of the agglomerate were randomly selected and the sizes of the 10 particles were measured. The average size of the particles was determined from the sizes of the selected particles in the 10 photographs.

B. Surface area

The aromatic amide polymer particle agglomerates to be tested were dried and then subjected to measure as to surface area thereof by a nitrogen-absorption method by means of an automatic surface area-measuring machine, Type 2200, made by Micromatrix Instrument Co., Ltd., U.S.A.

C. Bulk density

The dry aromatic amide polymer particle agglomerates to be tested were packed in a graduated cylinder having an inside volume of 5 ml through a funnel-shaped inlet thereof in such a manner that the agglomerates flowed down the inside wall surface of the cylinder without tapping against the cylinder and were loosely packed in the cylinder. The bulk density of the agglomerates was determined from the volume and weight of the agglomerates in the cylinder.

EXAMPLES 1 to 3

A. Preparation of aromatic amide polymer particle agglomerates

In each of Examples 1 to 3, a poly(m-phenylene isophthalamide) polymer was prepared in accordance with the interfacial polymerization method disclosed in U.S. Pat. No. 3,640,970.

In the preparation procedures, 173 g of m-phenylenediamine was dissolved in 1 liter of tetrahydrofuran, which was dehydrated by means of metallic sodium, to provide an aromatic diamine component solution. The diamine component solution was cooled to a temperature of 0° C.

Separately, 325 g of isophthalic acid chloride was dissolved in 1 liter of tetrahydrofuran dehydrated by means of metallic sodium to provide an aromatic dicarboxylic acid component solution. The resultant dicarboxylic acid component solution was cooled to a temperature of 0° C.

The dicarboxylic acid component solution was gradually poured in the form of a thin flow into the diamine component solution for a first step reaction while the mixture was cooled and stirred at a temperature of 0° C., to provide a dispersion of a precondensate. Next, the resultant precondensate-containing dispersion was admixed into a solution of 200 g of sodium carbonate in water in a ratio $A/(A+B)$ of the volume A of the dispersion to the sum $(A+B)$ of the volumes of the dispersion (A) and the sodium carbonate solution (B) as shown in Table 1, for the second step reaction, while the admixture was stirred at a high speed of stirring wing ends shown in Table 1.

An aromatic amide polymer having an inherent viscosity of 1.8 was obtained in the form of white fine particle agglomerates.

The resultant agglomerates were washed with water and then dried.

The dried agglomerates had a microscopic appearance as shown in FIGS. 1 and 2 and exhibited the properties as shown in Table 1.

TABLE 1

| Example No. | Production of agglomerates | | | Properties of agglomerates | | |
|---|---|---|---|---|---|---|
| | $\dfrac{A}{A+B}$ | Speed of stirring using end (m/sec) | Average size of particles ($\mu$m) | Average size of agglomerates ($\mu$m) | Surface area of agglomerates (m$^2$/g) | Apparent bulk density of agglomerates (g/cm$^3$) |
| 1 | 0.55 | 25 | 1 | 200 | 4.0 | 0.35 |
| 2 | 0.50 | 30 | 0.7 | 130 | 4.8 | 0.31 |
| 3 | 0.45 | 30 | 0.6 | 100 | 5.5 | 0.28 |

B. Compression molding

In each of Examples 1 to 3, the resultant aromatic amide polymer particle agglomerates were compression molded into a flat plate having a thickness of 3 mm under the following conditions.

Heating temperature: 320° C.

Compression pressure: 330 kg/cm$^2$

Molding time: 40 minutes

In the compression molding procedure, air in the mold was replaced by nitrogen gas to avoid the undesirable contact of the agglomerates with air during the molding procedure.

In each of Examples 1 to 3, the resultant molded article was easily, smoothly released from the mold and had a smooth and glazed surface.

The resultant plates exhibited the mechanical properties as shown in Table 2.

TABLE 2

| Example No. | Tensile strength (kg/mm$^2$) | Ultimate elongation (%) | Modulus (kg/mm$^2$) |
|---|---|---|---|
| 1 | 11.5 | 4.2 | 346 |
| 2 | 11.7 | 4.5 | 335 |
| 3 | 11.9 | 4.8 | 331 |

The plates could be easily cut and shaved such that the surface portions of the plates could easily be engraved in a desired pattern by means of a conventional engraving machine.

EXAMPLE 4

A. Preparation of aromatic amide polymer particle agglomerates

The same procedures as those described in Example 1 were carried out except that in the first step reaction, the temperatures of the diamine component solution and the dicarboxylic acid component solution were adjusted to −15° C. and the first step reaction mixture was added with 590 mg of aniline at the middle stage of the first step reaction.

The resultant white polymer particle agglomerates had an intrinsic viscosity of 1.4. In the polymer molecules, 30% of the terminal radicals thereof were blocked with aniline. The terminal-blocked polymer exhibited an enhanced heat resistance.

The agglomerates were composed of fine particles having an average size of 0.9 μm and had an average size of 200 μm, a surface area of 4.8 m²/g, and an apparent bulk density of 0.35 g/cm³.

B. Compression molding

The resultant aromatic amide polymer powder was compression molded into a dumbbell-shaped specimen under the following conditions:

Heating temperature: 300° C.
Compression pressure: 310 kg/cm²
Molding time: 35 minutes Throughout the compression molding procedure, the inside space of the mold was maintained under vacuum.

The resultant molded specimen had the mechanical properties as shown below.

Tensile strength: 12.4 kg/mm²
Ultimate elongation: 5.0%
Modulus: 331 kg/mm²

COMPARATIVE EXAMPLE 1

The same procedures as those disclosed in Example 1 were carried out except that in the second step reaction, the ratio A/(A+B) was 0.7 and the speed of the stirring wing ends was 8 m/sec.

The resultant aromatic amide polymer powder exhibited the following properties.

Average size of fine particles: 18 μm
Average size of agglomerates: 600 μm
Surface area of agglomerates: 0.7 m²/g
Apparent bulk density of agglomerates: 0.13 g/cm³

Also, the resultant compression molded plate exhibited the mechanical properties as shown below.

Tensile strength: 7 kg/mm²
Ultimate elongation: 3.2%
Modulus: 240 kg/mm²

EXAMPLES 5 to 7

In each of Examples 5 to 7, the same procedures as those described in Example 1 were carried out except that the aromatic dicarboxylic acid component solution contained 227.5 g of isophthalic acid chloride and 97.5 g of terephthalic acid chloride.

In the second step reaction, the ratio A/(A+B) and the speed of the stirring wing ends were adjusted to the level shown in Table 3.

The resultant while aromatic polymer powders exhibited an intrinsic viscosity of 1.8 and had the properties as shown in Table 3.

TABLE 3

| | Production of agglomerates | | Average size of fine particles (μm) | Properties of agglomerates | | |
|---|---|---|---|---|---|---|
| Example No. | Ratio $\frac{A}{A+B}$ | Speed of stirring using ends (m/sec) | | Average size of agglomerates (μm) | Surface area of agglomerates (m²/g) | Bulk density agglomerates (g/cm³) |
| 5 | 0.54 | 26 | 1.2 | 220 | 3.8 | 0.36 |
| 6 | 0.50 | 30 | 0.9 | 140 | 4.5 | 0.33 |
| 7 | 0.48 | 32 | 0.7 | 115 | 5.0 | 0.30 |

The resultant compression molded plates were easily released from the mold, had a smooth and glazed surface, and exhibited the mechanical properties as shown in Table 4.

TABLE 4

| Example No. | Tensile strength (kg/mm²) | Ultimate elongation (%) | Modulus (kg/mm²) | Izod Impact strength (kg · cm/cm) |
|---|---|---|---|---|
| 5 | 11.8 | 4.4 | 350 | 7.8 |
| 6 | 12.0 | 4.7 | 338 | 7.9 |
| 7 | 12.2 | 5.0 | 333 | 7.6 |

The plates were easily cut, shaved, and engraved by means of a conventional processing machine.

EXAMPLE 8

The same procedures as those described in Example 5 were carried out except that in the first step reaction, the temperatures of the diamine component solution and the dicarboxylic acid component solution were adjusted to −15° C. and the first step reaction mixture was mixed with 590 mg of aniline at the middle stage of the first step reaction.

The resultant copolymer was white and had an intrinsic viscosity of 1.4. In the copolymer molecules, 30% of the terminal radicals thereof were blocked with aniline. The terminal-blocked copolymer exhibited an enhanced heat resistance.

The resultant aromatic amide copolymer particle agglomerates were composed of fine particles having an average size of 0.9 μm and had an average size of 200 μm, a surface area of 4.8 m²/g, and an apparent bulk density of 0.35 g/cm³.

The resultant aromatic amide copolymer powder was compression molded into a dumbbell-shaped specimen under the same conditions as described in Example 4.

The resultant molded specimen had the mechanical properties as indicated below.

Tensile strength: 12.6 kg/mm²
Ultimate elongation: 5.1%
Modulus: 340 kg/mm²
Izod impact strength: 8.2 kg.cm/cm

EXAMPLES 9 to 11

In Examples 9 to 11, the same procedures as those described respectively in Examples 1 to 3 were carried out with the following exception.

A mixture of the aromatic amide polymer powder of each of Examples 9 to 11 with poly(m-phenylene isophthalamide) short cut fibers (TEIJINCONEX) having a denier of 2 and a length of 3 mm in an amount of 10% based on the weight of the aromatic amide polymer powder was subjected to the same compression molding procedure as that described in Example 1.

In each of Examples 9 to 10, the resultant molded plate was easily released from the mold and had a smooth and glazed surface.

The molded plates exhibited the mechanical properties as shown in Table 5.

TABLE 5

| Example No. | Tensile strength (kg/mm$^2$) | Ultimate elongation (%) | Modulus (kg/mm$^2$) | Izod Impact strength (kg · cm/cm) |
| --- | --- | --- | --- | --- |
| 9 | 12.5 | 4.8 | 348 | 7.8 |
| 10 | 12.0 | 5.0 | 350 | 8.0 |
| 11 | 12.3 | 4.7 | 336 | 7.7 |

EXAMPLE 12

The same procedures as those described in Example 4 were carried out with the following exception.

In the compression molding procedure, the molding feed consisted of the resultant aromatic amide polymer powder and poly(p-phenylene terephthalamide) short cut fibers having a denier of 1.5 and a length of 1 mm in an amount of 10% based on the weight of the aromatic amide polymer powder.

The resultant molded specimen exhibited the mechanical properties as shown below.

Tensile strength: 12.9 kg/mm$^2$
Ultimate elongation: 5.2%
Modulus: 350 kg/mm$^2$
Izod impact strength: 8.5 kg.cm/cm

EXAMPLE 13

The same procedures as those described in Example 4 were carried out with the following exception.

In the compression molding procedure, the molding feed consisted of the resultant aromatic amide polymer powder and carbon fibers having a diameter of 3.7 μm and a length of 1 mm in an amount of 10% based on the weight of the aromatic amide polymer powder.

The resultant molded specimen exhibited the following mechanical properties.

Tensile strength: 13.5 kg/mm$^2$
Ultimate elongation: 5.0%
Modulus: 400 kg/mm$^2$
Izod impact strength: 10.5 kg.cm/cm

EXAMPLE 14 to 16

In Example 14, 30 g of the same poly(m-phenylene isophthalamide) polymer particle agglomerates as those described in Example 1 were compression molded into a flat plate having a thickness of 4 mm, length of 100 mm, and a width of 50 mm by means of a compression molding machine under the following conditions.

Heating temperature: 320° C.
Compression pressure: 490 kg/cm$^2$
Molding time: 30 minutes In the compression molding procedure, air in the mold was replaced by nitrogen gas.

The resultant flat plate exhibited the mechanical properties as shown in Table 6.

In Example 15, the same procedures as those described in Example 14 were carried out with the following exception.

A mixture of 27 g of the poly(m-phenylene isophthalamide) polymer particle agglomerates with 3 g of poly(p-phenylene terephthalamide) polymer pulp particles, which were available in the market, was dispersed in 100 ml of water. The aqueous dispersion was stirred in a home mixer for about 5 minutes. Thereafter, the agglomerate-pulp particle mixture was collected from the dispersion by means of filtration. The filtered mixture was opened on a dish and dried at a temperature of 120° C. in a dryer. The dried mixture was compression molded in the same manner as that described in Example 14.

The resultant flat plate exhibited the mechanical properties as shown in Table 6.

In Example 16, the same procedures as those described in Example 15 were carried out except that the poly(p-phenylene terephthalamide) polymer pulp particles were replaced by the synthetic polymer pulp partices which were produced from the polyamide polymer produced in accordance with the method described in U.S. Pat. No. 4,075,172, by the method disclosed in Japanese Examined Patent Publication (Kokoku) No. 59-16002.

The mechanical properties of the resultant flat plate are shown in Table 6.

TABLE 6

| Example No. | Tensile strength (kg/mm$^2$) | Flexural strength (kg/mm$^2$) | Izod Impact strength (kg · cm/cm) |
| --- | --- | --- | --- |
| 14 | 11.8 | 13.0 | 7.2 |
| 15 | 13.5 | 14.2 | 8.5 |
| 16 | 14.0 | 14.8 | 9.8 |

Table 6 clearly shows that the addition of the synthetic polymer pulp particles to the aromatic amide polymer particle agglomerates is highly effective for enhancing the tensile strength, flexual strength, and Izod impact strength of the resultant compression molded articles.

We claim:

1. An aromatic polyamide compression molding powder, produced by an interfacial polymerization process, comprising porous agglomerates having an average particle size of from 10 to 400 μm and a surface area of from 1 to 20 m$^2$/g, said agglomerates comprising a plurality of fine coalescible particles which have an average size of from 0.1 to 10 μm, which comprise at least one aromatic amide polymer comprising 40 to 100 molar % of recurring m-phenylene isophthalamide units and 0 to 60 molar % of at least one additional recurring aromatic amide unit.

2. The aromatic polyamide powder as claimed in claim 1, wherein the agglomerates have an apparent bulk density of from 0.2 to 0.4 g/cm$^3$.

3. The aromatic polyamide powder as claimed in claim 1, wherein the aromatic amide polymer has an inherent viscosity of from 0.5 to 4.0 determined in a solution thereof in N-methyl-2-pyrrolidone at a temperature of 30° C.

4. The aromatic polyamide powder as claimed in claim 1, wherein at least 10% of the terminal groups of the aromatic amide polymer molecules are blocked with a monofunctional aromatic compound.

5. The aromatic polyamide powder as claimed in claim 1, wherein the recurring m-phenylene isophthalamide units are in a content of at least 85 molar %.

6. The aromatic polyamide powder as claimed in claim 1, wherein the additional recurring aromatic amide units are recurring m-phenylene terephthalamide units.

7. The aromatic polyamide powder as claimed in claim 6, wherein the recurring m-phenylene terephthalamide units are in a content of 60 molar % or less.

8. The aromatic polyamide powder as claimed in claim 1, wherein the aromatic amide polymer comprises 40 to 80 molar % of recurring m-phenylene isophthalamide units and 20 to 60 molar % of recurring m-phenylene terephthalamide units.

9. An aromatic polyamide powder of claim 1, having mixed therewith, reinforcing fibers.

10. An aromatic polyamide powder of claim 1, having mixed therewith, at least one reinforcing fiber selected from the group consisting of synthetic polymer fibers, carbon fibers and synthetic polymer pulp particles.

* * * * *